(12) United States Patent
Revels (10) Patent No.: US 8,804,526 B2
(45) Date of Patent: Aug. 12, 2014

(54) MANAGEMENT OF DATA CONGESTION IN A DATA NETWORK

(75) Inventor: William Revels, Whiterock (GB)

(73) Assignee: British Telecommunications plc, London (GB)

( * ) Notice: Subject to any disclaimer, the term of this patent is extended or adjusted under 35 U.S.C. 154(b) by 506 days.

(21) Appl. No.: 12/993,046

(22) PCT Filed: May 18, 2009

(86) PCT No.: PCT/EP2009/003516
§ 371 (c)(1),
(2), (4) Date: Nov. 16, 2010

(87) PCT Pub. No.: WO2009/141105
PCT Pub. Date: Nov. 26, 2009

(65) Prior Publication Data
US 2011/0069616 A1    Mar. 24, 2011

(30) Foreign Application Priority Data

May 17, 2008    (GB) .................................. 0809014.4

(51) Int. Cl.
H04L 12/26    (2006.01)
(52) U.S. Cl.
USPC ............................ 370/236; 709/232; 709/235
(58) Field of Classification Search
CPC ......... H04L 47/10; H04L 47/11; H04L 47/33; H04L 47/193; H04L 47/196; H04L 47/263; H04L 47/2416
USPC .................................. 370/236, 392; 709/235
See application file for complete search history.

(56) References Cited

U.S. PATENT DOCUMENTS 6,160,793 A * 12/2000 Ghani et al. .................. 370/236
(Continued)

FOREIGN PATENT DOCUMENTS

EP    1441288 A2    7/2004

OTHER PUBLICATIONS

Schulzrinne, et. al. , "RFC 2326: Real Time Streaming Protocol (RTSP)", Apr. 1998, Network Working Group, Standards Track, p. 29.*
Dracinschi A, et al., "Congestion Avoidance for Unicast and Multicast Traffic", Universal Multiservice Network, USA, pp. 360-368 (2000).

(Continued)

Primary Examiner — Hassan Kizou
Assistant Examiner — Amy Ling
(74) Attorney, Agent, or Firm — Nixon & Vanderhye PC (57) ABSTRACT

A congestion management apparatus for receiving a traffic data stream and an associated control signal, wherein the apparatus detects a congestion indicator in the traffic data stream and generates congestion control data. The apparatus incorporates the congestion control data into the control signal and sends the control signal to a streaming server to control the rate at which the streaming server sends the traffic data. The apparatus selects an adaptation method depending on a protocol associated with the control signal and generates the congestion control data in accordance with the adaptation method. The apparatus is modular and may be adapted to support a plurality of protocols and adaptation methods. The traffic data may comprise real time data, especially video data and/or audio data, transmitted using one or more connectionless transport protocol, such as Real-time Transport Protocol (RTP) over User Datagram Protocol (UDP).

22 Claims, 8 Drawing Sheets

(56) References Cited

U.S. PATENT DOCUMENTS

| | | | |
|---|---|---|---|
| 7,349,948 B2* | 3/2008 | Bussani et al. | 709/217 |
| 7,672,234 B2* | 3/2010 | McAuley et al. | 370/230 |
| 7,688,721 B2* | 3/2010 | Pike et al. | 370/229 |
| 8,081,609 B2* | 12/2011 | Balachandran et al. | 370/338 |
| 8,099,758 B2* | 1/2012 | Schaefer et al. | 726/1 |
| 8,180,283 B2* | 5/2012 | Balachandran et al. | 455/24 |
| 8,184,534 B2* | 5/2012 | Plamondon | 370/230 |
| 2002/0004842 A1* | 1/2002 | Ghose et al. | 709/235 |
| 2002/0194361 A1* | 12/2002 | Itoh et al. | 709/233 |
| 2003/0067872 A1* | 4/2003 | Harrell et al. | 370/229 |
| 2005/0089043 A1* | 4/2005 | Seckin et al. | 370/395.21 |
| 2007/0133419 A1* | 6/2007 | Segel | 370/236 |
| 2008/0037425 A1* | 2/2008 | Pan et al. | 370/235 |
| 2008/0248789 A1* | 10/2008 | Song et al. | 455/414.3 |
| 2009/0285099 A1* | 11/2009 | Kahn et al. | 370/236 |
| 2009/0319686 A1* | 12/2009 | Watanabe | 709/240 |
| 2010/0260043 A1* | 10/2010 | Kimmich et al. | 370/229 |
| 2011/0044279 A1* | 2/2011 | Johansson et al. | 370/329 |

OTHER PUBLICATIONS

Karimi O.B., et al., "Application Level Wireless Multi-Level ECN for Video and Real-Time Data", Networking, International Conference on Systems and International Conference on Mobile Communications and Learning Technlogies, USA, p. 137 (2006).

Communication pursuant to Article 94(3) EPC dated Feb. 27, 2012, in EP Application No. 09 749 595.6-2414.

Response to Communication pursuant to Article 94(3) EPC dated Feb. 27, 2012, in EP Application No. 09 749 595.6-2414 filed Aug. 8, 2012.

Dracinschi, et al., "Congestion avoidance for unicast and multicast traffic," Universal Multiservice Networks 2000, ECUMN 2000, 1$^{st}$ European Conference on Oct. 2-4, 2000, Piscataway, New Jersey, pp. 360-368.

Mortier, "Multi-Timescale Internet Traffic Engineering," IEEE Communications Magazine, IEEE Service Center, Piscataway, New Jersey, vol. 40, No. 10, Oct. 2002, pp. 125-131.

* cited by examiner

MANAGEMENT OF DATA CONGESTION IN A DATA NETWORK

CROSS-REFERENCE TO RELATED APPLICATIONS

This application is a Submission under 35 U.S.C. §371 for U.S. National Stage Patent Application of International Application No. PCT/EP2009/003516, filed May 18, 2009, entitled "IMPROVEMENTS IN AND RELATING TO THE MANAGEMENT OF DATA CONGESTION IN A DATA NETWORK", which claims priority to United Kingdom Patent Application No. 0809014.4, filed May 17, 2008, the entirety of which are all incorporated herein by reference.

FIELD OF THE INVENTION

The present invention relates to the management of data congestion in a data network, especially where the data is communicated in real time.

BACKGROUND TO THE INVENTION

Data networks convergence is a facet of current and future network infrastructure deployments. The general idea is to converge disparate networks onto a single common network that can support voice, video and other data traffic. Of significance is the introduction of real-time traffic types, especially voice and video traffic, where it is important that the traffic reaches its destination within a predefined time otherwise the user experiences, say, a telephone call or video with delays and jitter, resulting in poor quality. In general these traffic types expect to have a quality quotient applied to the networks they traverse which allows them to have priority over less important traffic types thus ensuring delays and jitter do not occur. This ensures the user's Quality of Service (QoS).

There are a number of elements that can be employed to ensure a network has an acceptable QOS. These include (especially in Internet Protocol (IP) based networks): classification of traffic to determine its type; marking with a priority indicator based on how important the traffic type is; congestion management techniques that ensure high priority traffic is passed first; congestion avoidance schemes that randomly drop packets in the hope of avoiding congestion; traffic conditioning that applies certain bandwidth limits to traffic types; compression to improve bandwidth efficiency; and packet fragmentation to reduce excessive delay because of large packets.

Of importance is the ability for a network to advise that it is about to experience congestion. This is often referred to as incipient congestion and allows a sender to inform a receiver that it is experiencing delay at some point on a particular traffic flow, in response to which the sender can then reduce its transmission rate until the threat of congestion has passed.

An industry standard that supports incipient congestion in data networks that support IP is called Explicit Congestion Notification (ECN) and is defined in RFC 3168—The Addition of ECN to IP.

ECN is a congestion avoidance scheme that marks IP packets in the network instead of dropping them when congestion thresholds are met. Receivers of marked packets can then decrease their transmit rate to avoid the risk of heavy congestion.

Figures 1, 2:
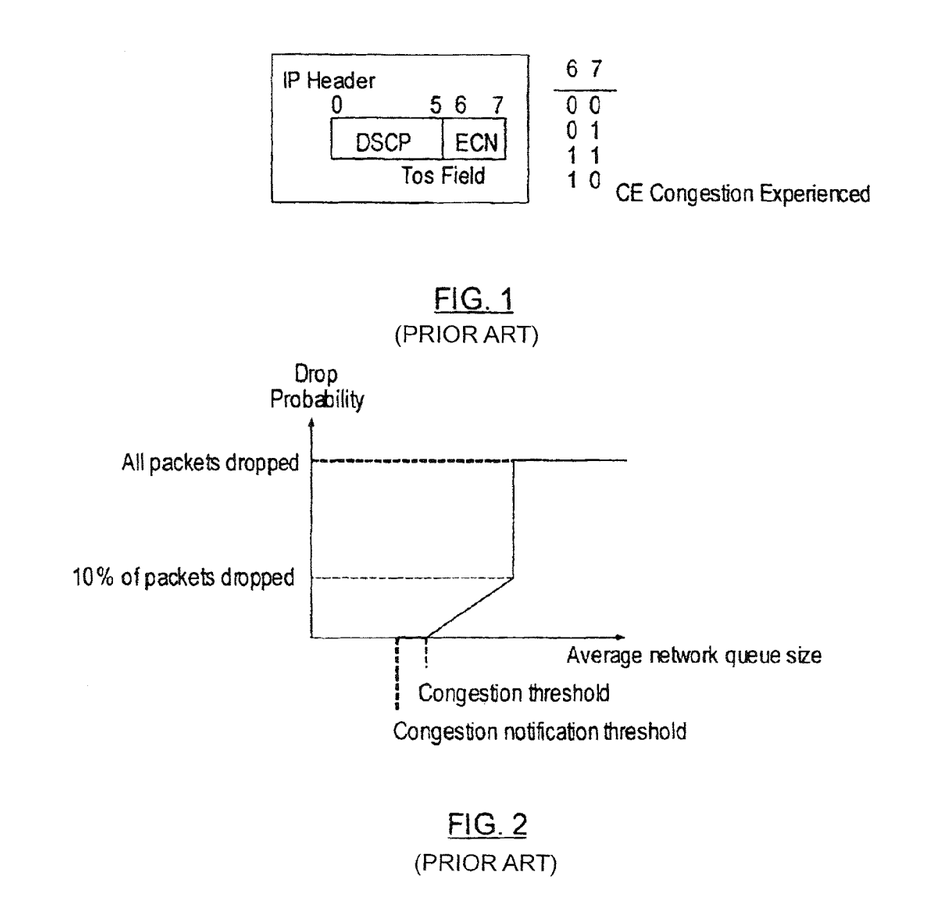
FIG. 1 is a schematic representation of the header of an IP data packet showing a two bit congestion notification field.
FIG. 2 is a graph illustrating congestion notification and Weighted Random Early Detection (WRED)

As an example and with reference to FIG. 1, Cisco implements a variant of congestion notification which marks two bits in IP packet headers (in the former ToS byte, now redefined by DiffServ to the DSCP field). The two IP bits carry information about IP packet flow between hosts through the routed network and importantly whether congestion has been experienced, this happens when the CE bits are both set.

Cisco Congestion Notification is an extension of Weighted Random Early Detection (WRED) functionality. WRED is an active queue management congestion avoidance mechanism that drops packets as a congestion indicator to end points. This is based on drop thresholds set. When Congestion Notification is configured instead and congestion thresholds are set, instead of dropping packets end hosts receive a signal that allows them to slow down the rate at which they are transmitting. This is illustrated in FIG. 2.

Because ECN is a notification mechanism it must be introduced into other technologies, standards and protocols to effect change. In the case of EP transport, Transmission Control Protocol has a standards definition for this and is ECN compliant. Any endpoint senders and receivers that can successfully negotiate IP ECN and are ECN TCP capable and on an ECN architected network will be able to rate limit traffic using the TCP rate adaptation mechanisms. However, with the convergence of data networks it is necessary to accommodate a plurality of protocols that are not necessarily compliant with ECN. In particular, real time data transmissions often employ a connectionless protocol such as User Datagram Protocol (UDP) which is unsuited to conventional ECN schemes.

It would be desirable to mitigate this problem.

SUMMARY EXEMPLARY EMBODIMENTS

A first aspect of the invention provides a congestion control apparatus for a data network including a first server having means for sending a traffic data stream to a first client across the network, said first server and said first client being arranged to communicate with one another across the network by means of a control signal comprising control data for controlling said traffic data stream, the apparatus being adapted to receive from the network said traffic data stream and the associated control signal, the apparatus comprising means for detecting a congestion indicator in said traffic data stream; means for generating, in response to detecting said congestion indicator, congestion control data; means for incorporating said congestion control data into said control signal; and means for sending said control signal incorporating said congestion control data to said first server across said network.

In response to detecting a congestion indicator, the preferred apparatus is arranged to determine an adaptation method depending on a protocol associated with said control signal, said congestion control data being generated in accordance with said adaptation method.

In preferred embodiments, said apparatus is adapted for incorporation into a packet switched data network, especially an Internet Protocol (IP) network, wherein said data takes the form of data packets comprising a packet header and a payload.

Typically, said traffic data comprises real time data, especially video data and/or audio data, usually carried in the payload of data packets. In preferred embodiments, said first server is arranged to send said traffic data to said first client using one or more connectionless transport protocol, for example User Datagram Protocol (UDP). Preferably, said data traffic is sent using Real-time Transport Protocol (RTP), for example RTP over UDP.

In preferred embodiments, said control data includes data that determines the rate at which said first server sends said traffic data to said first client. Conveniently, said control signal is sent between said first client and said first server using Real Time Streaming Protocol (RTSP), for example RTSP over Transmission Control Protocol (TCP).

Preferably, said detecting means comprises means for monitoring packet headers. Typically, said congestion indicator is implemented by one or more data bits in a packet header, usually the packet headers of said traffic data stream. Conveniently, said detecting means is arranged to detect said congestion indicator by determining the setting of said one or more data bits.

In preferred embodiments, said apparatus is arranged to return said traffic data stream to said network after said detecting means has checked for the presence of said congestion indicator.

Preferably, said apparatus is arranged to return said control signal to the network in the event that detecting means determines that said congestion indicator is not present.

In preferred embodiments, said apparatus includes means for determining at least one protocol (including at least one implementation (or version) of a protocol), used to communicate said control signal. The protocol determining means is advantageously arranged to recognise a plurality of protocols and/or implementations (versions) of protocols, especially application layer protocols. In particular, the protocol determining means may be arranged to recognise a plurality of implementations of RTSP and/or similar protocols. Preferably, said protocol determining means is co-operable with a protocol module comprising a plurality of selectable protocols and/or implementations of protocols. Advantageously, said protocol module is modular such that protocols and/or implementations of protocols can be added or removed.

Preferably, said means for generating congestion control data comprises an adaptation module arranged to implement at least one, but preferably a plurality of selectable, adaptation methods for generating congestion control data, especially congestion control data for controlling the flow of said traffic data from said first server to said first client. Advantageously, said adaptation module is modular such that adaptation methods can be added or removed.

Preferably, said apparatus includes means for generating one or more operating parameter values for use by said adaptation module in implementing said adaptation methods. Said parameter generating means may determine said parameter values by any suitable method, for example based on the rate of previous congestion detections, the detected protocol/protocol implementation, the selected adaptation method, time variables and/or bandwidth variables.

A second aspect of the invention provides a data network comprising one or more apparatus according to the first aspect of the invention.

A third aspect of the invention provides a method for controlling congestion in a data network including a first server having means for sending a traffic data stream to a first client across the network, said first server and said first client being arranged to communicate with one another across the network by means of a control signal comprising control data for controlling said traffic data stream, the method comprising receiving, at a congestion control apparatus, said traffic data stream and the associated control signal from the network; detecting a congestion indicator in said traffic data stream; generating, in response to detecting said congestion indicator, congestion control data; incorporating said congestion control data into said control signal; and sending said control signal incorporating said congestion control data to said first server across said network.

A fourth aspect of the invention provides a computer program product comprising computer program code recorded on a computer usable medium, the computer program code being arranged to cause a computer to perform the method of the third aspect of the invention.

Preferred embodiments of the invention relate to the optimisation of Real Time Protocol (RTP) over User Datagram Protocol (UDP) traffic on Internet Protocol (IP) networks when Explicit Congestion Notification (ECN) is detected on the network. The proxy server or personal computer is used to allow easy integration of methods to address this, thereby providing a more efficient means of data transfer for streaming media and alleviating network congestion caused by this traffic type.

The term "server" as used herein is intended to embrace computer programs, including middleware, and computer systems that provide services to clients or other entities across a network. The congestion management apparatus of the first aspect of the invention may be said to comprise a server in that it provides services to clients that receive traffic and also to the servers that provide the traffic. The congestion management apparatus of the first aspect of the invention may be said to comprise a proxy server in that it acts as an intermediary between clients and servers.

Further advantageous aspects of the invention will become apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figure 3:
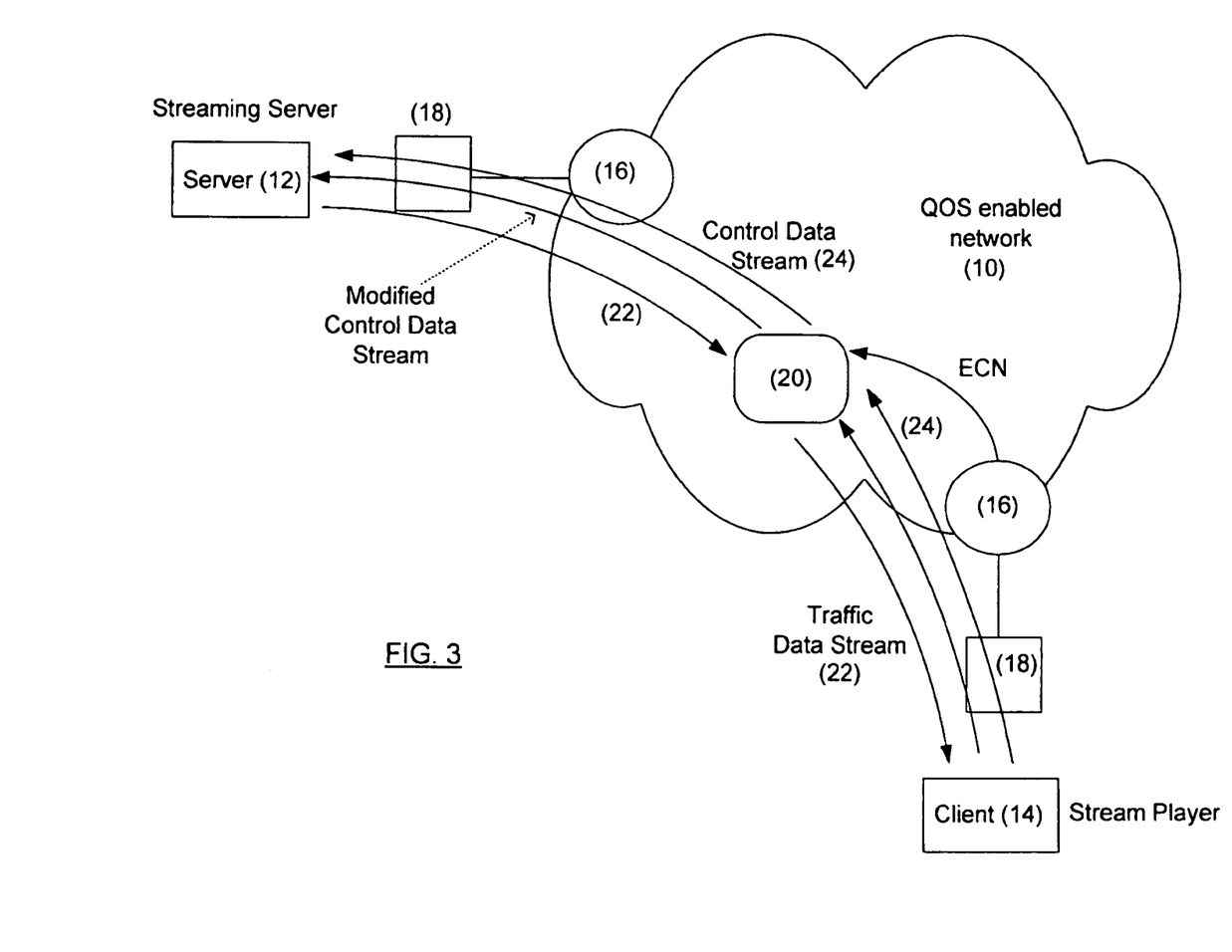
FIG. 3 is a schematic diagram of a data network incorporating a congestion management apparatus server embodying one aspect of the present invention.

Referring now to FIG. 3 of the drawings, there is shown, generally indicated as 10, a data network embodying one aspect of the invention. The network 10 typically comprises a computer network and usually comprises a Wide Area Network (WAN), e.g. the Internet, typically incorporating one or more Local Area Networks (LANs). In typical embodiments, at least part of the network 10 is a packet switched network supporting the Internet Protocol (IP) suite.

The network 10 includes a plurality of network elements capable of communication with one another. At least some of the network elements are servers and/or clients, others may be routers or other devices for facilitating communication between clients and servers. It will be understood that any given network element may be capable of acting as more than one of a client, a server and a router. In the example network of FIG. 3, only one server 12 and one client 14 are shown. The client 14 and server 12 are each shown in the form of a computer, for example a personal computer (PC), supporting one or more client/server applications. It will be understood that the clients and servers may take the form of any other suitable application and/or device. FIG. 3 shows, for illustration purposes only, two routers 16 and two edge routers 18 (the edge routers for example comprising switches representing a LAN environment) for providing communication between the client 14 and the server 12. In preferred embodiments, the server 12, client 14 and any intermediate network elements communicate using IP.

The server 12 includes one more applications (not shown) capable of communicating data, such as audio data and/or video data, to the client in real time. The server 12 typically also includes one or more applications for creating the real time data from, for example, a user's audio or video input. The data is rendered to a user at the client in real time and this is commonly referred to as data streaming.

Streaming video data is a particular real-time traffic type that embodiments of the present invention are suitable for optimizing. There are a number of variants of streaming video: unicast video telephony, unicast video streaming, multicast video streaming and multicast video conferencing. Unicast streaming video establishes a data flow between a sending streaming server and a receiving client. Should the network that this data flow traverses experience incipient congestion, mitigating action should be taken since actual congestion is imminent.

Real-time Transport Protocol (RTP) is a known transport protocol for streaming video and can be used with Real Time Streaming Protocol (RTSP), which allows the client to remotely control the streaming server, i.e. RTP is used for payload transmission and RTSP for control of that data. RTP uses a connectionless transport protocol, in particular User Datagram Protocol (UDP), as a transport mechanism, which is more suitable than TCP for real-time traffic. Typically, the server 12 sends a data stream comprising IP packets to the client 14 in a connectionless manner, i.e. without first establishing a connection with the client 14, however the data stream will have been previously requested by the client 14 using a separate RTSP control signal. The IP packets comprise an IP header and an IP payload. The IP payload comprises a UDP header and a UDP payload. The UDP payload comprises an RTP header and a RTP payload. The RTP payload comprises the real time data, e.g. audio or video data, which is being transmitted from server to client. The RTSP-encapsulated control data is typically sent between the client and server within IP packets separately from the real time data.

In FIG. 3, streamed data from the server 12 to the client 14 is represented by traffic flow lines 22. In typical embodiments, the streamed traffic 22 comprises RTP-encapsulated (particularly RTP over UDP in the present case) real time data, e.g. audio and/or video data, or other media content. The control (or signalling) data sent between the server 12 and client 14 is represented by signalling flow lines 24. In typical embodiments, the control data 24 comprises RTSP-encapsulated control data.

It is desirable that real-time traffic, such as audio and video data, are not subjected to excessive network delay. A well architected network will try to address these issues through the varied QOS measures available. To derive additional QOS and efficiency benefits from a network, Wide Area Network optimisation can be introduced. This is a generic term for a range of technologies that address particular traffic types. However, ECN for UDP is not supported by current industry standards.

Figure 9:
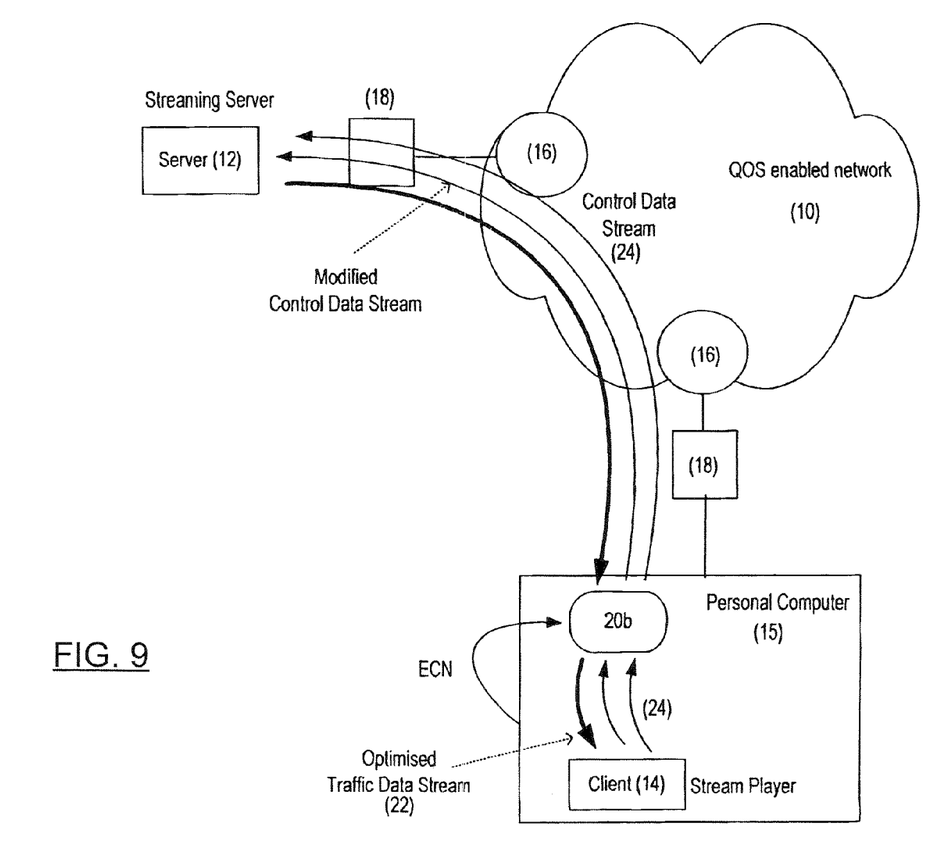
FIG. 9 is a schematic diagram illustrating an alternative deployment of the congestion management apparatus in a personal computer.

Preferred embodiments of the invention improve ECN UDP data streaming, especially video streaming, by providing an element, in the preferred form of a congestion management apparatus typically comprising software and especially middleware, in the network to detect ECN, and in particular IP ECN, and, when this is detected, to amend RTSP protocol fields to effect change in streaming applications. This enables optimisation of streaming traffic flows to adjust, i.e. reduce or increase, RTP/UDP transmission rates as determined by the congestion management apparatus. In the preferred embodiment, the congestion management apparatus comprises middleware implementing a suitable algorithm, as is described in more detail below, but may alternatively be implemented by any suitable software and/or hardware. The congestion management apparatus may be supported by any suitable computing device in the network 10, for example a device, such as a router 16, at the edge of the network 10 or a device, such as a PC, at an end point of the network 10. The congestion management apparatus may be referred to as a server in that it provides services to clients that receive traffic and also to the servers that provide the traffic. The apparatus may also be referred to as a proxy server in that it serves as an intermediary between a client 14 and server 12. In cases where the congestion management server is supported by a device, for example a router 16, other than the device that supports the client 14, the server may be associated with its own IP address that is used by the servers 12 and clients 14 as a proxy IP address to which traffic or control signals are sent when the servers 12/clients 14 are communicating with one another. A further advantage afforded by preferred embodiments is that more granular control of ECN TCP streaming video can be achieved without the reliance on ECN TCP compliant operating systems. The benefit of introducing this technology is to effect change, given detected ECN, without the reliance of integrating into sender or receiver applications. Network congestion that would have a detrimental impact on the network and users as a whole can thus be offset.

In FIG. 3, the network 10 includes a congestion management apparatus, or congestion management server 20, embodying one aspect of the invention. Conveniently, the server 20 is implemented using computer software and so may be provided on any network element capable of running software applications. For example, the server 20 may be provided on a router 16, or a server device or other computer connected to a router. Typically, the server 20 is provided on a router located at an edge of the network 10, the router being connected to at least one but typically several clients. The server 20 is especially suited for location at traffic bottlenecks in the network 10. By way of example, the server 20 comprises middleware software supported by a hardware platform and software operating system consisting of a single server unit installed close to the core network edge at potential bottlenecks and will proxy streaming traffic. The server 20 is adapted to interface into the routing or switching environment of the network 10 and will logically be part of the IP infrastructure.

It will be seen that the real time traffic 22 is sent from the server 12 to the client 14 via the congestion management server 20, and that the control data 24 between the server 12 and client 14 is sent via the server 20. To this end, one or more network elements, e.g. the client 14, the server 12 and or one or more routers 16, 18 as applicable, are adapted to direct the traffic 22 and/or control data 24 as applicable to the IP address of the server 20.

FIG. 9 illustrates an alternative embodiment, in which like numerals are used to indicate like parts and in which the network 10 includes a congestion management apparatus, or server, 20b embodying the invention, the server 20b being supported by, or installed on, a computing device 15, for example a personal computer (PC), that is located at an end point of the network 10. In this example, the computing device 15 is the same computer that supports the client 14 and so the client 14 and the server 20b may conveniently share a common IP address. The server 20b is especially, but not exclusively, suited for location at traffic endpoints in the network 10. By way of example, the server 20b comprises middleware software supported by a hardware platform and software operating system consisting of a single device installed at a network endpoint. The server 20b is adapted to interface into the routing or switching environment of the network 10 and will logically be part of the IP infrastructure.

It will be seen from FIG. 9 that the real time traffic 22 is sent from the server 12 to the client 14 via the server 20b, and that the control data 24 between the server 12 and client 14 is sent via the server 20b. To this end, one or more network elements, e.g. the client 14, the server 12 and or one or more routers 16, 18 as applicable, are adapted to direct the traffic 22 and/or control data 24 as applicable to the IP address of the server 20b.

Figure 4:
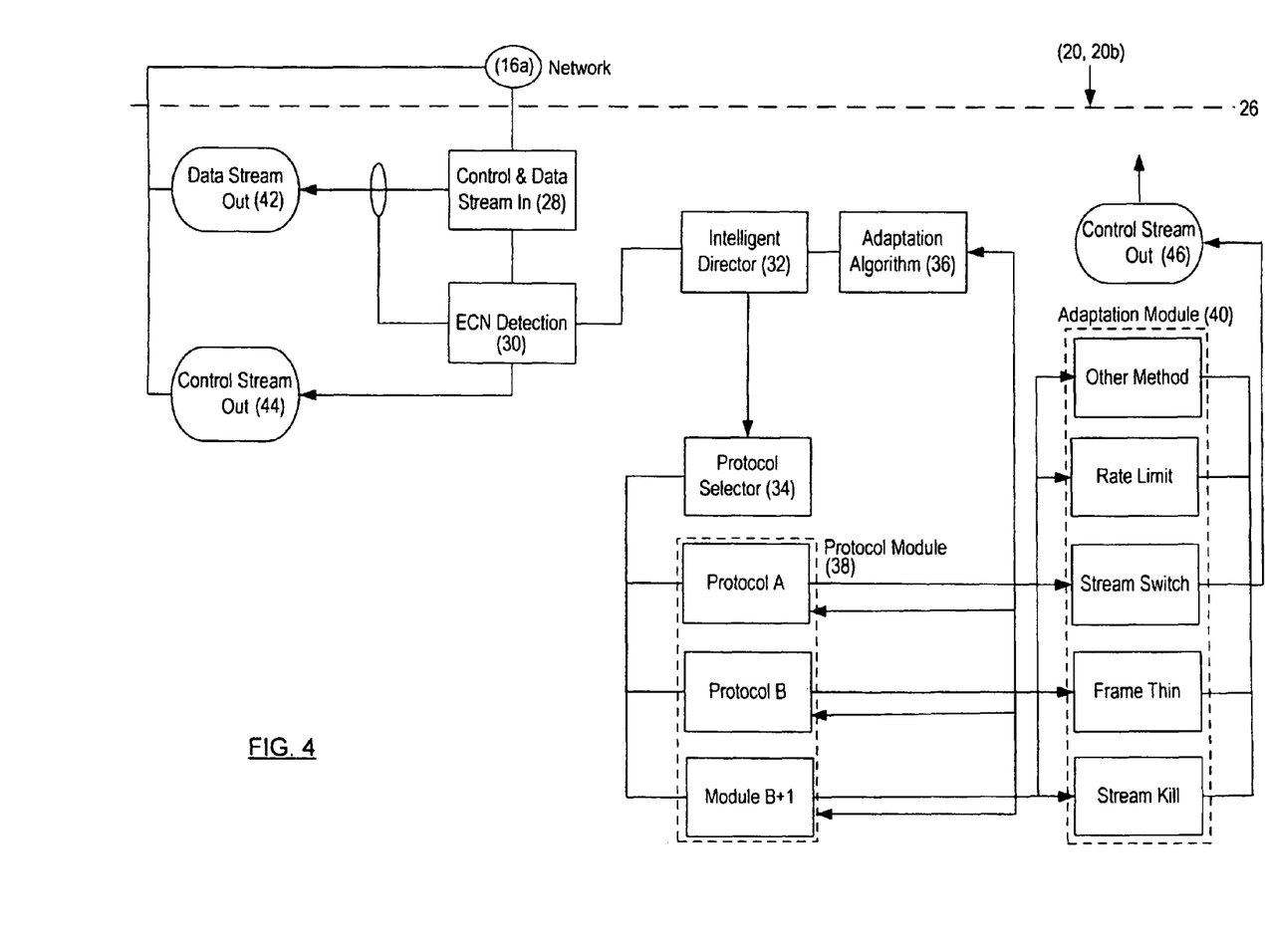
FIG. 4 is a schematic diagram of the congestion management apparatus of FIG. 3.

Referring now to FIG. 4, the congestion management apparatus 20, 20b is described in more detail. In FIG. 4, the network 10 is represented by a network interface 16a and notional line 26 separates the server 20, 20b from the network 10.

The preferred server 20, 20b comprises a Control and Data Stream In module 28, an ECN Detection module 30, an Intelligent Director module 32, a Protocol Selector module 34, an Adaptation Algorithm 36, a Protocol Module 38, and an Adaptation Module 40.

In use, streaming video, or other content data, traffic is forwarded from the server 12 to the congestion management server 20, 20b. The server 20 of FIG. 3 will normally be at the edge of an enterprise or service provider network where access circuits are concentrated to distribute across a high bandwidth core. The server 20b of FIG. 9 will normally be an endpoint on an enterprise or service provider network. Each individual flow that meets the criteria (in this example streaming media i.e. an RTP/UDP content stream and RTSP/TCP signal stream) for this traffic type has its control data 24 and content traffic 22 redirected to the Control and Data Stream In module 28. To this end, the client 14 or server 12, as appropriate, may use a specific IP address for the server 20 of FIG. 3 for directing traffic/control signals to the server 20, or a network element such as a router is adapted to forward the traffic type to the server 20. In the case of server 20b of FIG. 9, the client 14 uses internal directing means, conveniently implemented in software, to direct traffic/control signals within the computing device 15 between the server 20b and the client 14, while the server 12 uses a specific IP address to direct traffic/control signals to the server 20b (which is typically an IP addressed that is shared with the client 14, e.g. the, or an, IP address of the computer 15.

The Control and Data Stream In module 28 separates the control data 24 and the content data stream 22. The RTSP control stream 24 normally arrives first at the server 20, 20b, and is forwarded to the streaming server 12 by the server 20, 20b to request that streamed content is sent to the client 14 (via the server 20, 20b). The control and content signals 24, 22 are not normally synchronized with one another but rather match the content stream 22 to the control signal stream 24 by using source/destination IP address and source/destination port numbers. The content data traffic 22, which typically comprises RTP over UDP data, is effectively passed through the server 20, 20b back to the network interface 16a, as is indicated by the Data Stream Out module 42. Since the content data 22 will have been sent from the server 12 addressed to the client 14 (in this case having the client's IP address in the IP header of the IP packets) when the content data 22 is returned to the network interface 16a it is sent to the client 14. The control data 24 is forwarded to the ECN detection module 30.

The ECN Detection module 30 analyses the content data traffic 22 as it is passed to the client 14. If the ECN detection module 30 detects the presence of ECN (which, as described above, may be achieved by detecting a congestion indicator typically in the form of one or more relevant codes in the relevant bits, e.g. the ECN CE bits, of the IP header data packets) it redirects the stream control traffic 24 to the Intelligent Director module 32. Otherwise, it passes the control traffic 24 back out onto the network interface 16a, with the appropriate address set to reach the client 14. The control data 24 is changed by the server 20, 20b and passed to the streaming server 12 which then effects change on the RTP content stream 22 to the client 14. In the FIG. 3 embodiment, the server 20 effectively breaks the client-server relationship and so changes IP addresses in both directions.

The Intelligent Director module 32 passes control data 24, typically comprised of RTSP header and payload data to the Protocol Selector module 34, and sends a respective tag, or other indicator, uniquely identifying each IP packet and end-end IP flow to the Adaptation Algorithm module 36. At this point the IP packet containing the RTSP header and payload is uniquely tagged with a unique identifier, e.g. number, to identify each IP packet and end-end stream or flow in memory so that they can be referred to at other points within the server 20, 20b and matched with the IP content stream 22.

In preferred embodiments, once congestion notification is detected in the content stream 22, each subsequent packet of the control stream 24 is sent to the Intelligent Director 32 so long as the congestion notification persists. The content stream 22 is preferably analysed for congestion notification on a packet-by-packet basis. The control stream 24 is preferably also processed by the server 20, 20b on a packet-by-packet basis.

Each vendor of a streaming server application may have a different implementation (or version) regarding the protocols and software they use to control streams in the event of congestion. The server 20, 20b includes means for supporting a plurality of protocols, including protocol versions. In preferred embodiments, the server 20, 20b may be said to support a respective protocol method for each protocol (including protocol versions) that is supported. The protocol methods determine how the server 20, 20b operates in response to detecting a respective protocol. This is supported by the modular concept of the congestion management apparatus 20,20b. For example, the Helix streaming server provided by RealNetworks Inc. is open source and supports bandwidth control using bandwidth rate control and stream switching. Amending the bandwidth to a limit specified by the Adaptation Algorithm module 36 allows granular rate control to the extent of the current codec supported by that stream. If multiple same content streams have been encoded then it is possible to stream switch and rate control down until the next stream switch. Microsoft's streaming server is slightly different and does not support bandwidth rate control or stream switching to the extent that they are usable at present. In this instance, an adaptation technique known as stream thinning can be used to control bandwidth on the network 10 by removing data frames at regular intervals. Advantageously, because the congestion management server 20, 20b exhibits a modular approach to streaming content it is possible to quickly introduce new protocols and vendor implementations of protocols within the Protocol Module 38. A benefit of providing a congestion management server 20, 20b integrating with applications using standards based protocols is that it can be done surreptitiously using middleware as shown by way of example in FIGS. 3 and 9 without the consequent vendor engagement and software changes usually required. Once the Protocol Selector module 34 determines the appropriate protocol method to use (described in more detail hereinafter), it passes the tagged RTSP header and payload data to the Protocol Module 38. To determine which protocol method to use, the Protocol Selector Module 34 may employ any suitable technique, e.g. examining known port numbers to determine the protocol used, and data within the RTSP header and payload to determine the streaming server vendor.

By way of example, one of the protocol methods may be to support RTSP for a Helix server. The protocol method would then determine the selection of an adaptation method to support this, e.g. a rate limiting adaptation method. The Protocol Module 38 supports a plurality of protocol methods, and therefore a plurality of protocols or protocol versions, that are selectable by the Protocol Selector module 34. In FIG. 4, these are shown by way of example as "Protocol A", "Protocol B" and "Module B+1". The modular nature of the Protocol Module 38 allows addition or removal of protocol methods as required. The protocol method selected by the Protocol Selector 34 within the Protocol Module 38 determines which adaptation method(s) may be used to control the content data 22 being streamed from the server 12. The selected protocol method causes the Protocol Module 38 to request from the Adaptation Algorithm 36 a parameter value required to effect change to the tagged RTSP header and payload when implementing the selected adaptation method(s).

The Adaptation Algorithm 36 receives a tag from the Intelligent Director 32 in respect of each IP packet. It is also notified of the selected (and tagged) protocol method and adaptation method from the Protocol Module 38 and returns to the Protocol Module 38 a correspondingly tagged parameter value for use by the adaptation method. An algorithm determines the parameter value by any suitable method, for example based on the rate of ECN detections, the selected protocol method and/or adaptation method, time variables and bandwidth variables.

Figure 8:
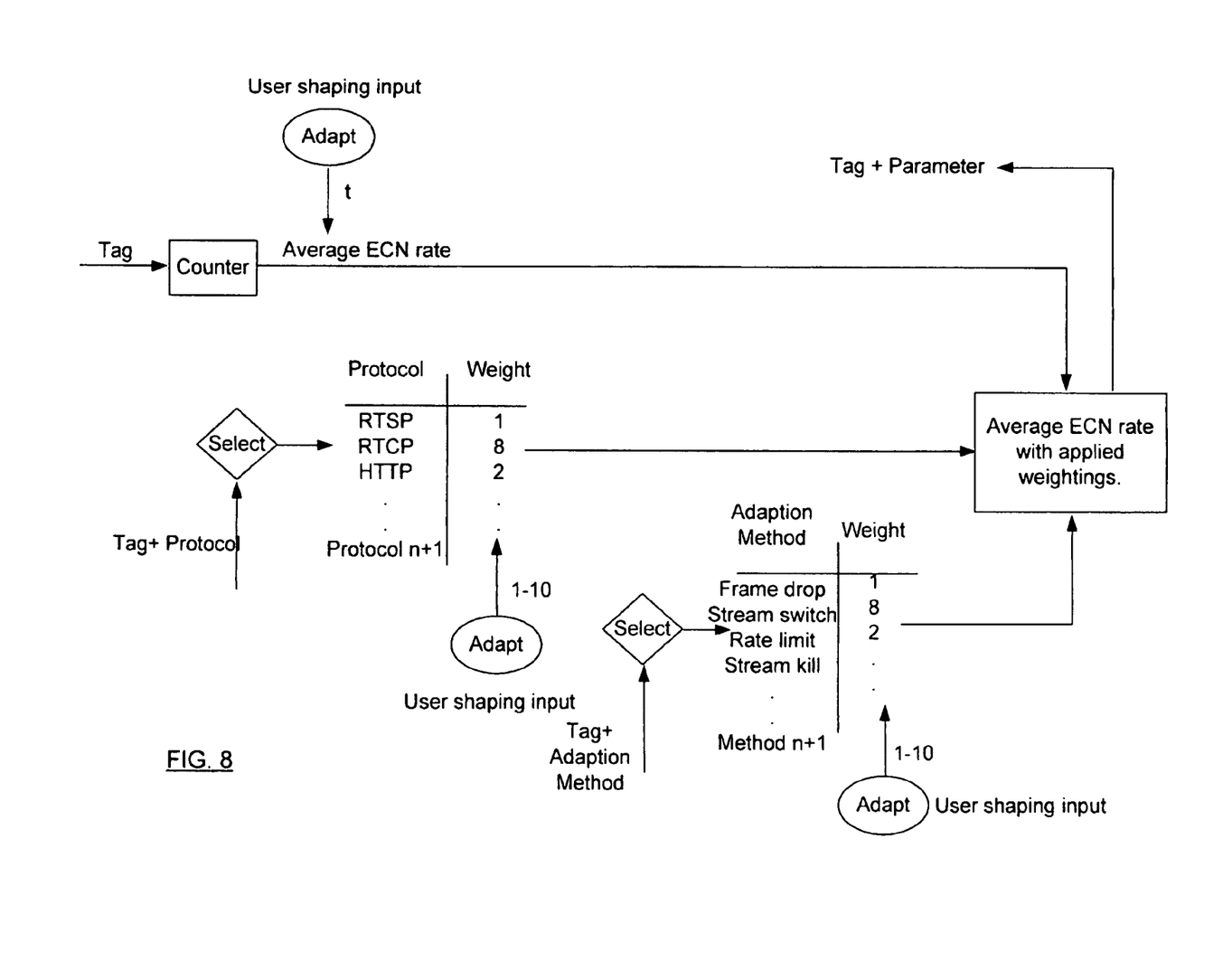
FIG. 8 is a representation of a preferred adaptation algorithm for use by the congestion management apparatus.

A preferred embodiment of the adaptation algorithm is now described with reference to FIG. 8. The Adaptation Algorithm module 36 receives a tag from the Intelligent Director 32 pertaining to a specific IP packet and flow between two IP endpoints. It also receives the selected and correspondingly tagged protocol method and adaptation method from the Protocol Module 38 and outputs a correspondingly tagged parameter value determined by the algorithm to the Protocol Module 38. The protocol method input specifies whether the control data 24 is using RTSP, RTCP or another one of a plurality of supported protocols. A weight, for example a numeric value in the range 1-10, is assigned to each protocol. The weight is preferably adaptive and can be changed with user intervention. The adaptation method specifies the approach used to effect change to the protocol, such as Frame Thinning, Stream Switching or another. Again a weight, for example a numeric value in the range 1-10, is assigned to each method. The weight is preferably adaptive and can be changed with user intervention.

The respective tag is passed to the adaptation algorithm each time an ECN is detected. On this basis, the ECN is counted for each tag and an average ECN rate, of for example numeric value 1-100/t, is determined. This rate is advantageously adaptive by an amount of a parameter "t" determined by user intervention. The adaptation algorithm generates an output parameter, for example in the form of a numeric value, that allows shaping of the streamed traffic by an amount determined by the configurable "average ECN rate" and configurable protocol method and adaptation method weightings applied to this rate. The parameter generated by the algorithm 36 determines the level, or severity, at which the selected adaptation method is applied. The algorithm calculates this parameter by taking into account the rate at which ECNs are being detected, the selected protocol method and the selected adaptation method.

The Adaptation Module 40 supports a plurality of adaptation methods that are selectable by the Protocol module 38. In FIG. 4, these are shown by way of example as including Rate Limiting, Stream Switch, Frame Thin, and Stream Kill. The modular nature of the Adaptation Module 38 allows addition or removal of adaptation methods as required.

The Protocol Module 38 passes the tagged RTSP header, payload and parameter value received from the Adaptation Algorithm 36 to the selected method within the Adaptation Module 40.

The tagged RTSP header and payload is adjusted by the Adaptation Module 40 in accordance with the parameter value provided by the Adaptation Algorithm 36. The control data 24 with adjusted RTSP header and payload is sent out onto the network 10 as illustrated in FIG. 4 by module 42. The outgoing control data 24 is addressed to reach the server 12. The adaptation data inserted into the control data 24 by the congestion management server 20, 20b, allows the server 12 to make the changes appropriate to optimise the streaming data traffic 22 from the server 12 to the client 14. Typically, the ECN indicator will specify one level of incipient congestion, in other words if incipient congestion is present or not. The preferred Adaptation Algorithm determines the level of adjustment implemented by the server 20, 20b, e.g. depending on the measured average rate of ECN, protocol method, adaptation method and a user configurable adaptive element.

In order to direct the outgoing control data 24 to the server 12, the congestion management server 20, 20b needs to know the address (in this case the IP address) of the server 12. Conveniently, the server address can be obtained from incoming control data 24 received by the server 20, 20b from the client 14 on its way to the server 12. In particular, the initial control data 24 sent between the server 12 and client 14 is sent from the client 14 to the server 12 and so will contain the IP address of the server 12. In the preferred embodiment, the Control Stream Out Module 46 receives a tag and RTSP header and payload changed by the Adaptation Method within the Adaptation Module 40. It also retrieves the original tag from memory which refers to the respective IP Header (or packet). The Module 46 can thus match both elements using the tag and repackage the RTSP header and payload in the IP packet to send to the original destination, i.e. the streaming server 12.

Figure 5:
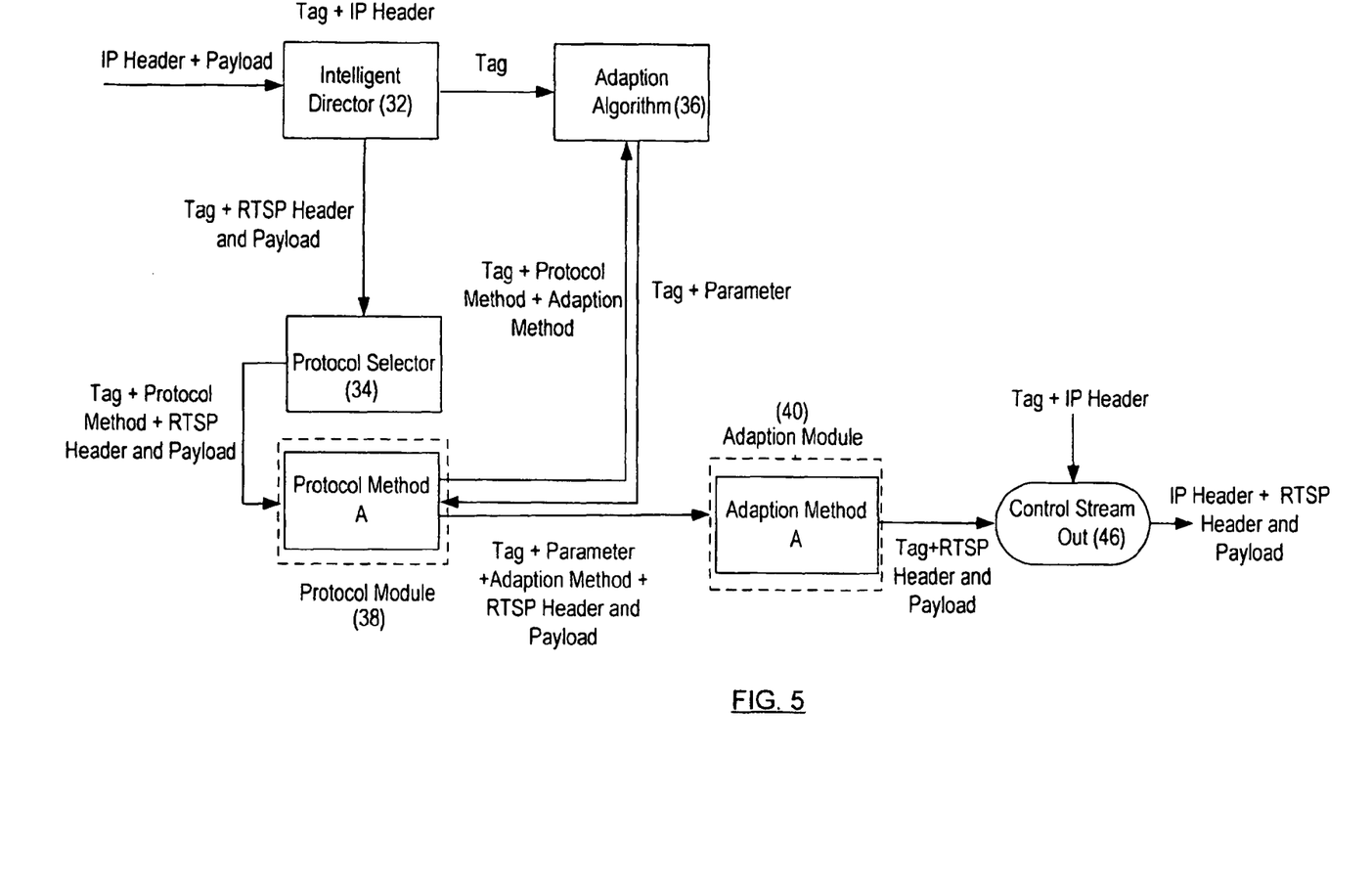
FIG. 5 is a schematic diagram illustrating the operation of some of the components of the congestion management apparatus of FIG. 4.

Referring now to FIG. 5, the interaction between the Intelligent Director module 32, Adaptation Algorithm module 36, Protocol Selector module 34, Protocol Module 38 and Adaptation Module 40 is described in more detail.

The Intelligent Director module 32 receives control data 24 typically in the form of IP packets comprising IP header and payload (the payload comprising the RTSP header and payload). It strips the IP header from the IP payload and places the IP header in memory (not shown) for later use. The intelligent director 32 generates a unique identifier, or tag, for the IP packet so that it, or its constituent parts, can be referenced at other points within the congestion management server 20, 20b. For example, the respective tag may be stored with, or otherwise associated with the respective IP header in memory, and/or may accompany, or be otherwise associated with, the IP payload as is passes through the server 20, 20b.

The IP packet payload comprising the RTSP header and payload is forwarded to the Protocol Selector module 34. The respective tag is forwarded to the Adaptation Algorithm module 36.

The Protocol Selector module 34 receives the tagged RTSP header and payload, it makes a decision regarding the appropriate protocol method to use and passes the tagged RTSP header and payload and selected protocol method to the Protocol Module 38.

The Protocol Module 38 provides a modular means to introduce new protocol methods. It also manages the flow of information between the Adaptation Algorithm module 36 and the Adaptation Module 40. The adaptation method is selected in accordance with the selected protocol method and is passed with the tagged protocol method to the Adaptation Algorithm module 36, which returns a tagged parameter value for use by the Adaptation Module 40 when implementing the selected adaptation method. The tagged adaptation method, RTSP header and payload and parameter value are passed to the Adaptation Module 40.

The Adaptation Module 40 provides a modular means to introduce new adaptation methods for effecting change to the control data 24. It receives the tagged RTSP header and payload, selected adaptation method and parameter value and uses the appropriate method to effect change to the RTSP header and payload by an amount specified by the parameter value. The now amended tagged RTSP header and payload is passed to the Control Stream Out module 42 where it is matched to the tagged IP header stored by the Intelligent Director 32 and forwarded with the appropriate IP address to its destination, namely the server 12. In the preferred embodiment, the adaptation method is determined by the protocol method. The preferred Protocol Module 38 and Adaptation Module 40 take the form of containers with standard interfaces and functions to allow easy introduction of additional protocol methods and adaptation methods.

Figure 6:
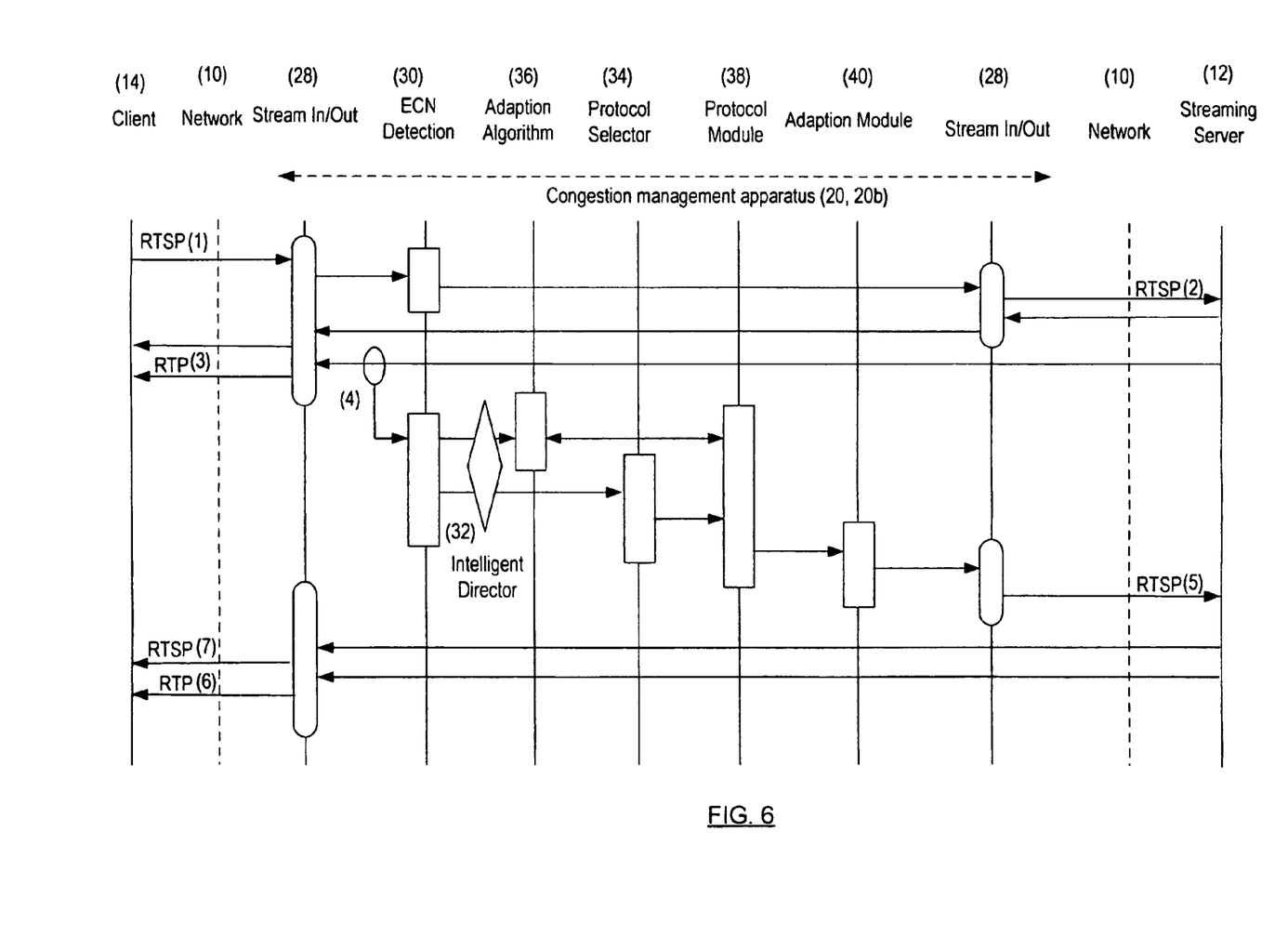
FIG. 6 is a schematic diagram illustrating the flow of traffic in the network of FIG. 1.
Figure 7:
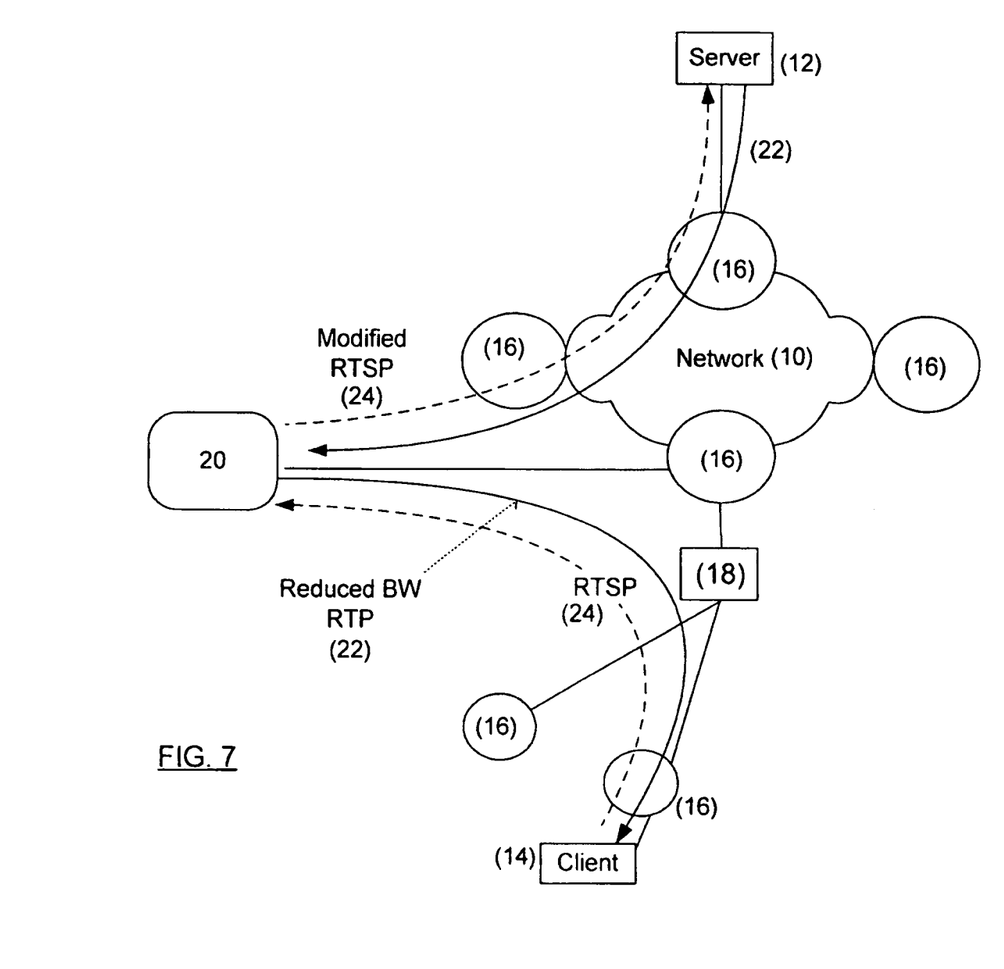
FIG. 7 is a schematic diagram illustrating a first deployment of the network management apparatus as a proxy server in the network.

The operation between the client 14 and server 12 is now described with reference to FIG. 6, where it is assumed that RTSP/TCP is used for signalling and RTP/UDP for streaming media content.

The streaming media client 14 initiates a request using RTSP (1) via the server 20, 20b Stream In/Out module 28 for streaming content from the streaming server 12. The ECN Detection module 30 replays this request (2) to the streaming server 12 which sends an RTP stream (3) to the client address (14).

The ECN Detector 30 monitors traffic (4) having the characteristics of the streaming media supported by server 20, 20b. If IP ECN has been set by the network 10 and detected by the ECN detector 30, the ECN Detector 30 issues an ECN notification signal to the Intelligent Director 32 and passes relevant RTSP header and payload data to the Adaptation Algorithm 36. The Intelligent Director 32 also forwards the RTSP header and payload to the Protocol Selector 34. The RTSP header and payload is tagged by the Intelligent Director 32 so it can be referenced throughout the server 20, 20b.

The Protocol Selector 34 makes a decision regarding protocol type, this is determined by the application, protocol and application vendor. Based on this decision the RTSP stream is passed to the most relevant protocol method supported by the Protocol Module 38.

The Protocol Module 38 allows tailored methods to support different selections such as protocol RTP/UDP using RTSP/TCP with the application Windows Media Services and vendor Microsoft. All of these methods can be easily integrated into the module 38 and provide an ability to adapt streaming based on the type criteria in the Protocol Selector 34. The module 38 then passes the RTSP header and payload to the appropriate adaptation method in the Adaptation Module 40 which effects change in the RTSP header and payload. A tagged parameter value is passed from the Adaptation Algorithm 36 to the Protocol Module 38 method at this point regarding the amount of change to effect on the RTSP stream. These are then also forwarded to the Adaptation Module 40.

If a positive ECN is detected (4), the Adaptation Algorithm module 36 receives information from the Intelligent Director 32 regarding the respective tag for uniquely identifying each packet of the data stream. It uses this information to build historical statistics regarding a particular end-to-end flow of streaming data and applies this learning to an algorithm to effect change in the stream by passing a respective parameter value to the Protocol Module 38 and onward transmission to the Adaptation Module 40. The algorithm parameter value is determined depending on the methods passed by the Protocol Module 38, ECN rate and configurable adaptive shaping applied by the system user.

The Adaptation Module 40 has a number of different adaptation methods available to support a particular Protocol Module 38 method. In the instance of a Protocol Module method using protocol RTP/UDP, RTSP/TCP, application Helix and/or vendor Real Systems, the adaptation methods used may include stream switching, rate limiting, frame dropping, and/or stream kill. The RTSP control data stream is changed at this point by an amount indicated by the Adaptation Algorithm module 36 via the Protocol Module 38. The Adaptation Module 40 passes the amended RTSP stream to the Stream In/Out 42 whose destination is the streaming server 12.

The server 12 amends the RTSP control stream (7) that is returned to the client 14 to advise of the amended RTP (6) data stream that is returned to the client 14. The RTP stream (6) will have been changed to reduce its bandwidth consumption by a sufficient amount, by the intervention of the server 20, 20b, to substantially offset the incipient congestion detected by the server 20, 20b.

The invention is described herein in the context of IP networks and particularly in the context of RTP/UDP and RTSP/TCP communications. It will be understood that the invention is not limited to use with these protocols. Preferred embodiments of the invention are independent of everything above layer 3 in the OSI model, i.e. IP in the present example. The Protocol Module 38 can be adapted to support any protocol(s) that stream data such as RTMP, RTP/TCP, RTP/HTTP/TCP and so on. Preferred embodiments of the invention are adapted for use with RTP/UDP when used in conjunction with ECN.

The invention is not limited to the embodiment described herein which may be modified or varied without departing from the scope of the invention.

The invention claimed is:

1. A congestion management apparatus for installation in a data network,
   said network comprising a server configured to send a Real-time Transport Protocol over a User Datagram Protocol (RTP/UDP) traffic data stream to a client across the data network, said server and said client communicating with one another across the data network by using Real-Time Streaming Protocol (RTSP) control signals including control data for controlling said traffic data stream,
   the congestion management apparatus being configured to receive said RTP/UDP traffic data stream from the server through the data network and to receive an associated RTSP control signal from the client through the data network,
   the congestion management apparatus including at least one processor configured to
       detect an Explicit Congestion Notification (ECN) congestion indicator in said traffic data stream;
       generate congestion control data, in response to detecting said congestion indicator;
       select an adaptation method according to a protocol associated with said received RTSP control signal, said congestion control data being generated in accordance with said selected adaptation method;
       modify the received RTSP control signal by incorporating said congestion control data into said RTSP control signal; and
   a router sending said modified RTSP control signal incorporating said congestion control data to said server across said data network.

2. The congestion management apparatus as claimed in claim 1, wherein said at least one processor is configured to determine at least one protocol used to communicate said RTSP control signal and to recognize a plurality of implementations of RTSP.

3. The congestion management apparatus as claimed in claim 1, wherein said at least one processor is configured to implement a plurality of selectable adaptation methods for generating congestion control data.

4. The congestion management apparatus as claimed in claim 3, wherein said at least one processor is configured to control the flow of said traffic data stream from said server to said client.

5. The congestion management apparatus as claimed in claim 4, wherein said at least one processor is configured to generate at least one operating parameter value, said at least one processor determining said parameter value depending on a rate of previous congestion detections.

6. The congestion management apparatus as claimed in claim 5, wherein said at least one processor is configured to determine said parameter value depending on the selected adaptation method.

7. The congestion management apparatus as in claim 3, wherein each adaptation method is provided by a modular adaptation module that can be added or removed.

8. The congestion management apparatus as in claim 3, wherein said operating parameter values are provided to an adaptation module for use in implementation of said adaptor methods.

9. The congestion management apparatus as claimed in claim 1, wherein said at least one processor is configured to check for presence of said congestion indicator before sending said traffic data stream to said client.

10. The congestion management apparatus as claimed in claim 1, wherein said router sends said control signal to said server when said congestion indicator is not present.

11. The congestion management apparatus as claimed in claim 1 configured for incorporation into a packet switched data network, wherein said traffic data and control data comprises data packets each having a respective packet header and a respective payload, and wherein packet headers are monitored for said congestion indicator.

12. The congestion management apparatus as in claim 1, wherein said at least one processor is configured to generate at least one operating parameter value, said at least one processor determining said parameter value depending on a protocol used to communicate said control signal.

13. The congestion management apparatus as in claim 1 that is located at an edge of said network.

14. The congestion management apparatus as in claim 1, wherein said apparatus and said client are provided in a common network element located at an endpoint of said network.

15. The congestion management apparatus as in claim 1, wherein said traffic data comprises real-time data carried in data packet payloads and representing at least one of video and audio data.

16. A data network comprising:
   a server configured to send a Real-time Transport Protocol over a User Datagram Protocol (RTP/UDP) traffic data stream to a client across the data network, said server and said client communicating with one another across the data network by using Real-Time Streaming Protocol (RTSP) control signals including control data for controlling said traffic data stream;
   a congestion management apparatus being configured to receive said RTP/UDP traffic data stream through the data network and to receive an associated RTSP control signal from the client through the data network, the congestion management apparatus including at least one processor configured to
       detect an Explicit Congestion Notification (ECN) congestion indicator in said traffic data stream;
       generate congestion control data, in response to detecting said congestion indicator;
       select an adaptation method according to a protocol associated with said received RTSP control signal, said congestion control data being generated in accordance with said selected adaptation method;
       modify the received RTSP control signal by incorporating said congestion control data into said RTSP control signal; and
   a router sending said modified RTSP control signal incorporating said congestion control data to said server across said data network.

17. A data network as claimed in claim 16, wherein said congestion management apparatus defines a network element, located at an edge of said data network.

18. The data network as claimed in claim 16, wherein said congestion management apparatus and said client are provided in a common network element.

19. The data network as claimed in claim 16, wherein said traffic data includes real time data, carried in a payload of data packets.

20. The data network as claimed claim 16, wherein said server sends said traffic data to said client using at least one connectionless transport protocol.

21. A method for controlling congestion in a data network, said method comprising:
   sending a traffic data stream from a server to a client across the data network using a Real-time Transport Protocol over a Datagram Protocol (RTP/UDP), said server and said client communicating with one another across the data network by using Real-Time Streaming Protocol (RTSP) control signals including control data for controlling said traffic data stream;

receiving said traffic data stream from the data network and receiving an associated RTSP control signal from the data network;

detecting an Explicit Congestion Notification (ECN) congestion indicator in said traffic data stream;

selecting an adaptation method according to a protocol associated with said received RTSP control signals;

generating congestion control data, in response to detection of said congestion indicator in accordance with the selected adaptation method;

modifying said RTSP control signal by incorporating said congestion control data into said control signal; and sending said modified RTSP control signal incorporating said congestion control data to said server across said data network.

22. The method of claim 21, wherein a check is made of the presence of said congestion indicator before said modified traffic data stream is sent to said client.

* * * * *